United States Patent
Weiss

(10) Patent No.: US 6,526,067 B1
(45) Date of Patent: Feb. 25, 2003

(54) METHOD OF TRANSMITTING DATA ON AN ISDN SUBSCRIBER LINE, AS WELL AS LINE TERMINATION, EXCHANGE, NETWORK TERMINATION, AND DATA TERMINAL THEREFOR

(75) Inventor: Waldemar Weiss, Sachsenheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/115,710

(22) Filed: Jul. 15, 1998

(30) Foreign Application Priority Data

Jul. 17, 1997 (DE) .......................................... 197 30 621

(51) Int. Cl.⁷ ............................... H04J 3/16; H04J 3/22
(52) U.S. Cl. ......................... 370/468; 370/264; 370/463
(58) Field of Search ................................. 370/488, 264, 370/265, 271, 299, 352, 353, 354, 356, 358, 419, 420, 421, 437, 438, 439, 465, 524, 525, 526, 463; 379/32.01, 32.02, 32.04, 229, 230, 231, 232, 234, 235

(56) References Cited

U.S. PATENT DOCUMENTS

| | | | |
|---|---|---|---|
| 3,700,820 A | | 10/1972 | Blasbalg et al. |
| 4,907,225 A | | 3/1990 | Gulick et al. |
| 5,317,415 A | | 5/1994 | Kinami et al. |
| 5,544,158 A | | 8/1996 | Oprea et al. |
| 5,931,928 A | * | 8/1999 | Brennan et al. ............... 710/68 |
| 5,959,998 A | * | 9/1999 | Takahashi et al. ........... 370/431 |
| 6,343,073 B1 | * | 1/2002 | Mashinsky ................... 370/352 |
| 6,356,556 B1 | * | 3/2002 | Toth et al. .................... 370/442 |
| 6,047,006 A1 | * | 4/2002 | Brakefield et al. ........... 370/524 |

FOREIGN PATENT DOCUMENTS

| | | |
|---|---|---|
| DE | 3544393 | 6/1987 |
| DE | 3544797 | 6/1987 |
| DE | 4441357 | 8/1995 |
| DE | 4423792 | 1/1996 |
| DE | 19549126 | 5/1997 |
| WO | 9323809 | 11/1993 |

OTHER PUBLICATIONS

Patent Abstracts of Japan, vol. 1996, No. 04, Apr. 30, 1996 & JP 07 321955 A (Sanyo Electric Co Ltd) Dec. 8, 1995.
"ATM switch capable of supporting unichannel and multichannel transmission" by T.–H. Cheng, IEE Proc.–Commun., vol. 143, No. 3 Jun. 1996, pp. 141–148.

* cited by examiner

Primary Examiner—Douglas Olms
Assistant Examiner—Phirin Sam
(74) Attorney, Agent, or Firm—Milton Oliver; Ware, Fressola, VDS & Adolphson LLP

(57) ABSTRACT

The invention relates to a method of transmitting data on an ISDN subscriber line having a data channel (D16) and two or more voice- or data-carrying channels (B64), using the data channel. The method is characterized in that on receipt of each connection request, a check is made to determine whether the desired connection can or is to be established as a data connection, that said connection is established via the data channel (D16), that a further check is made to determine whether a voice- or data-carrying channel (B64) is still free, that the capacity of said channel is added to the connection via the data channel (D16), that provision is made for continuously monitoring whether a voice- or data-carrying channel (B64) occupied by the data connection is requested for another connection or whether such a channel hitherto needed for another connection is no longer needed therefor, that a voice- or data-carrying channel (B64) requested by another connection and occupied by the data connection is made available for the requested connection, that the capacity of a channel no longer needed by another connection is added to the data connection, and that for the transmission of data over the data connection, the respective total available capacity is used. The invention further relates to a line termination for an exchange, an exchange with a line termination, a network termination for a data terminal, and a data terminal with a line termination.

5 Claims, 4 Drawing Sheets

METHOD OF TRANSMITTING DATA ON AN ISDN SUBSCRIBER LINE, AS WELL AS LINE TERMINATION, EXCHANGE, NETWORK TERMINATION, AND DATA TERMINAL THEREFOR

BACKGROUND OF THE INVENTION

1. Technical Field

This invention relates to a method of transmitting data on an ISDN subscriber line with a data channel and two or more voice- or data-carrying channels using the data channel, a line termination for an exchange, with devices for terminating at least one ISDN subscriber line, an exchange with a line termination, with devices for terminating at least one ISDN subscriber line, a network termination for a data terminal, for connection to an ISDN subscriber line, and a data terminal with a network termination for connection to an ISDN subscriber line.

2. Discussion of Related Art

Present-day ISDN subscriber lines have either a 16-kb/s' data channel, the so-called D channel, and two 64-kb/.voice- and data-carrying channels (2B+D), the so-called B channels, or a 64-kb/s data channel and 30 64-kb/s voice- and data-carrying channels(30B+D). The access structures are then referred to as basic access and primary access, respectively, with the D channels being referred to as D16 and D64 channels, respectively. Analogously, the B channels are sometimes referred to as B64 channels. Besides the two aforementioned cases, the abbreviation 2B+D is known.

The D channels are used primarily for signaling between the exchange and the subscriber terminal or private branch exchange. Capacity not used by a D channel can be used for data connections.

It is therefore possible to either carry data calls in the D channel or use one or more B channels for such calls. The contents of the data calls carried in D channels on the subscriber lines are combined in the network with other data calls and transferred on B channels or through a separate data network.

Those data calls which are usually carried in D channels generally have a burstlike character, which means that a larger data volume occasionally occurs for short periods of time, while no or a very small data volume occurs between those periods. If these data calls are actually carried in the D channel, the latter will be sufficient for such calls on the whole, but long waiting times may occasionally result for the user. If, however, such a data call is carried in a B channel, substantially shorter waiting times result for the user, but this channel is utilized uneconomically and is blocked for other tasks.

However, there are also other data calls, particularly those which are time-critical and are adapted for transmission over a B channel, for which these considerations do not apply and which must in any case be sent on a B channel. As a rule, this is determined by the subscriber that originates the call.

SUMMARY OF INVENTION

The object of the invention is to permit more effective utilization of a subscriber line for data calls which do not have to be carried in a B channel for other reasons.

In accord with a first aspect of the invention, a method of transmitting data on an ISDN subscriber line having a data channel and two or more voice- or data-carrying channels using the data channel; is characterized in that on receipt of each connection request, a check is made to determine whether the desired connection can be or is to be established as a data connection, that said connection is established via the data channel, that a further check is made to determine whether a voice- or data-carrying channel is still free, that the capacity of said channel is added to the connection via the data channel, that provision is made for continuously monitoring whether a voice- or data- carrying channel occupied by the data connection is requested for another connection or whether such a channel hitherto needed for another connection is no longer needed therefor, that a voice- or data-carrying channel requested by another connection and occupied by the data connection is made available for the requested connection, that the capacity of a channel no longer needed by another connection is added to the data connection, and that for the transmission of data over the data connection, the respective total available capacity is used.

According to a second aspect of the invention, a line termination for an exchange, comprising devices for terminating at least one ISDN subscriber line having a data channel and two or more voice- or data-carrying channels, is characterized in that the line termination further comprises means for checking upon receipt of each connection request whether the desired connection can be or is to be established as a data connection, for establishing said connection via the data channel, for checking whether a voice- or data-carrying channel is still free, for adding the capacity of said channel to the connection via the data channel, for continuously monitoring whether a voice- or data-carrying channel occupied by the data connection is requested for another connection or whether such a channel hitherto needed for another connection is no longer needed, for making a voice- or data-carrying channel requested by another connection and occupied by the data connection available for the requested connection, for adding the capacity of a channel no longer needed by another connection to the data connection, and for using the respective total available capacity for the transmission of data over the data connection.

According to a third aspect of the invention, an exchange with a line termination comprising devices for terminating at least one ISDN subscriber line having a data channel and two or more voice- or data-carrying channels, is characterized in that the line termination further comprises means for checking upon receipt of each connection request whether the desired connection can be or is to be established as a data connection, for establishing said connection via the data channel, for checking whether a voice- or data-carrying channel is still free, for adding the capacity of said channel to the connection via the data channel, for continuously monitoring whether a voice- or data-carrying channel occupied by the data connection is requested for another connection or whether such a channel hitherto needed for another connection is no longer needed, for making a voice- or data-carrying channel requested by another connection and occupied by the data connection available for the requested connection, for adding the capacity of a channel no longer needed by another connection to the data connection, and for using the respective total available capacity for the transmission of data over the data connection.

According to a fourth aspect of the invention, a network termination for a data terminal, for connection to an ISDN subscriber line having a data channel and two or more voice- or data-carrying channels, is characterized in that the network termination comprises means for establishing a desired connection via the data channel, for adding the capacity of a further channel to the connection via the data channel, for making a voice- or data-carrying channel requested by another connection and occupied by the data connection available for the requested connection, for adding the capacity of a channel no longer needed by another connection to the data connection, and for using the respective total available capacity for the transmission of data over the data connection.

According to a fifth aspect of the invention, a data terminal with a network termination, for connection to an ISDN subscriber line having a data channel and two or more voice- or data-carrying channels, is characterized in that the network termination comprises means for establishing a desired connection via the data channel, for adding the capacity of a further channel to the connection via the data channel, for making a voice- or data-carrying channel requested by another connection and occupied by the data connection available for the requested connection, for adding the capacity of a channel no longer needed by another connection to the data connection, and for using the respective total available capacity for the transmission of data over the data connection.

Thus, in principle, data is carried in the D channel as far as permissible, but the capacity of a B channel (or of two or more B channels) is used also as long as the latter is not occupied as such. Protocolwise, the data traffic is handled as D-channel connections.

These and other objects, features and advantages of the present invention will become more apparent in light of the following detailed description of a best mode embodiment thereof, as illustrated in the accompanying drawing.

BRIEF DESCRIPTION OF THE DRAWINGS

An embodiment of the invention will now be explained in more detail with reference to the accompanying drawing, in which.

DETAILED DESCRIPTION OF PREFERRED EMBODIMENTS

Figure 1A:
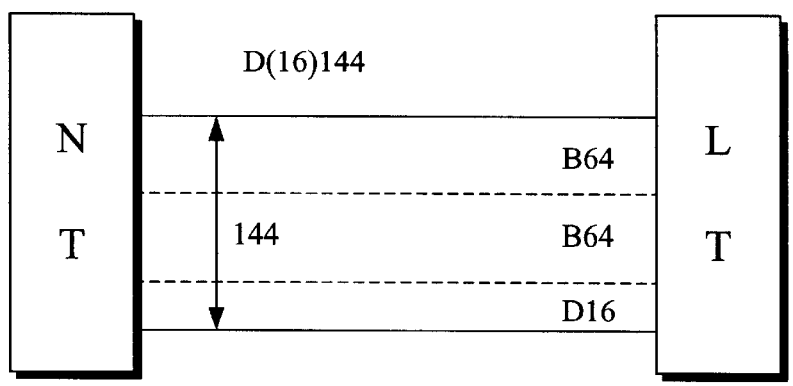
FIGS. 1(*a*), 1)*b*), and 1(*c*) show a network termination according to the invention and a line termination according to the invention in three different operating situations which result when carrying out the method according to the invention.
Figure 1B:
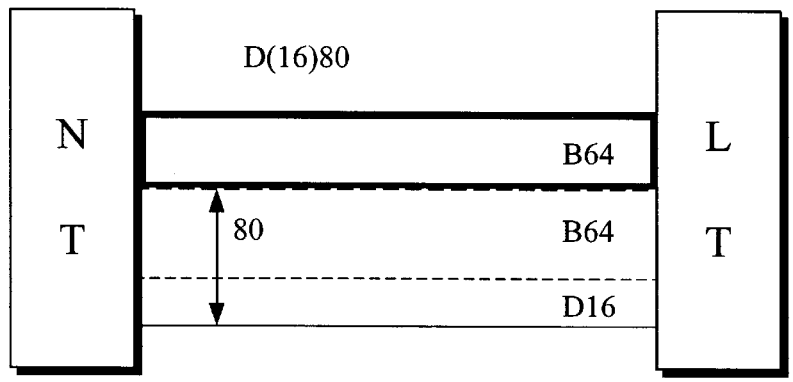
Figure 1C:
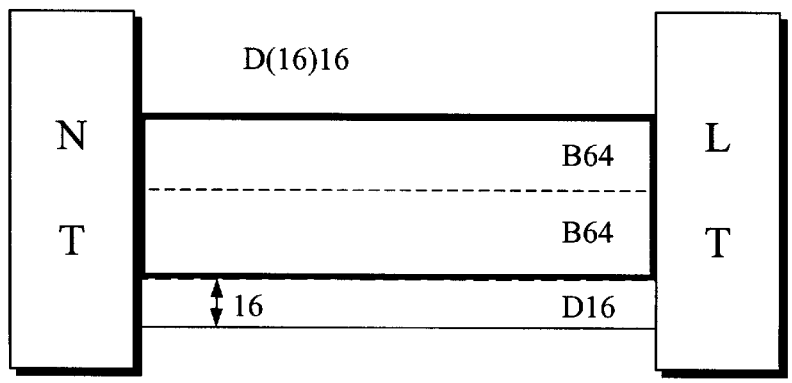

FIGS. 1(*a*) and (*c*) show in three similar representations arranged one below the other, a network termination NT, a line termination LT, and an ISDN subscriber line extending between the two terminations. The subscriber line is represented by the transmission channels transferred on it.

Figure 2:
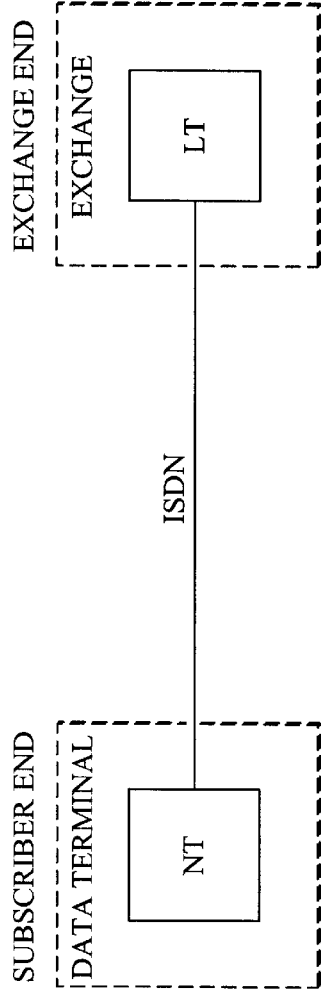
FIG. 2 shows a network termination NT as part of a data terminal at a subscriber end of an ISDN subscriber line and an LT as part of an exchange at an exchange end of the ISDN subscriber line.

The network termination NT is located at the subscriber end of the subscriber line, and the line termination LT at the exchange end. Technically, the network termination NT is part of a data terminal as shown in FIG. 2. For various reasons however, including organizational ones, the network termination NT is, as a rule, separate from the data terminal. Irrespective of how the means necessary to carry out the method according to the invention are actually distributed to the network termination and the data terminal, only the network termination is shown in FIGS. 1(*a*)–1(*c*). The same applies analogously to the line termination LT, which may be structurally united with an exchange.

The transmission line, as mentioned, is represented in FIGS. 1(*a*)–(1*c*) by the channels contained therein. In this case, a basic access structure with two B channels B64 and one D channel D16 (2B+D) is shown. As usual, the representation does not take account of the fact that the D channel is embedded in a 64-kb/s channel. In any case, the remaining capacity is not available for the transmission of user information. (The D channel itself, because of the signaling between the exchange and the subscriber terminal or private branch exchange, is not completely available for the transmission of user information, either). The fact that the same considerations apply for both directions is not shown, either. The method according to the invention can, of course, be used for both directions independently of each other.

Figure 3:
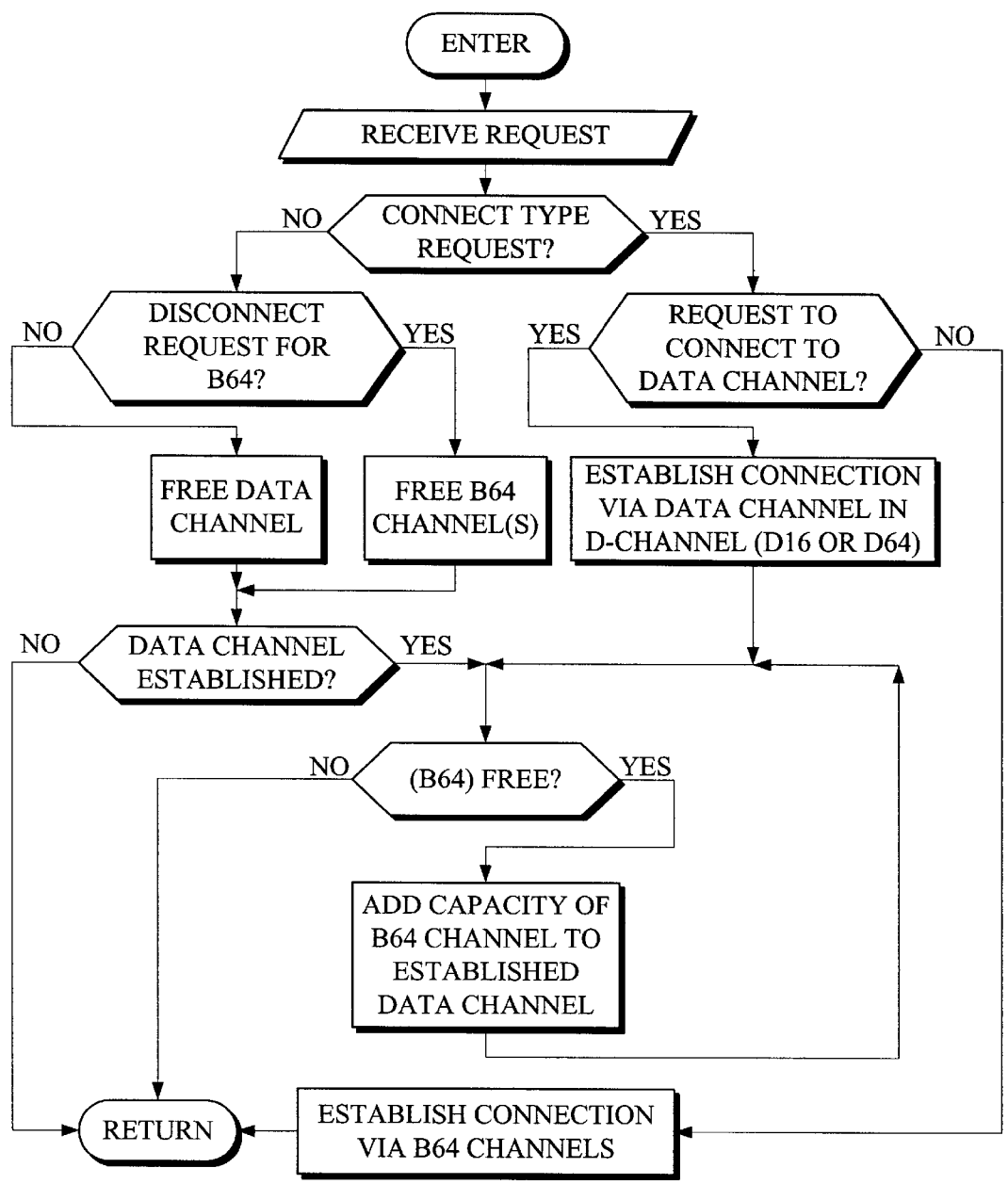
FIG. 3 shows a series of steps which may be carried out, according to the invention.

Let us first assume that no call is being transferred on this subscriber line. If a request is received, as shown in FIG. 3, that one of the two sides wants to make a call which either can be identified as a call suitable for being carried in the D channel or is to be explicitly carried in this channel, the line termination LT will be informed thereof via signaling information that a connection type of request has been received. The line termination LT, together with the network termination NT, then makes both the capacity of the D channel and that of the two B channels available for this call by establishing a connection via the data channel in the D-channel. protocolwise, however, the entire connection is a D-channel connection which, aside from the signaling that continues to take place in the D channel proper, now has a total of 144 kb/s available. This is indicated here by the designation D(16)144, see FIG. 1(*a*).

If, in addition, a request to set up a voice call is signalled, this request will have priority and the capacity of a B channel will have to be made available for it. The D channel will then be reduced to a channel with up to (signaling) 80 kb/s. It is shown in the second line of FIG. 1(*b*) and designated as D(16) 80.

If a further B channel is requested, the necessary capacity will have to be made available and only the D channel proper will remain, as shown in FIG. 1(*c*) as D(16) 16.

If one of the B channels is no longer used as such, its capacity will be added to the D channel again.

The same applies, of course, if a B channel was already occupied when a D channel is requested, or if only the minimum capacity of the D channel is available for the time being. At any rate, the total subscriber-line capacity not needed for B channels is added to the D channel at any point of time.

All of this is indicated in FIG. 3 by a decision step, as shown, in which a check is made to determine if (B64) is free and, if so, its capacity is added to the established data channel.

FIG. 3 also shows various other steps that may be taken according to the results of various determinations made in corresponding decision steps shown.

For call charging, the greater capacity made available need not be taken into account, since it cannot be used on the subscriber line anyhow. If in the onward routing network the data call is carried as a packet call, the primary consideration there is the total amount of data transmitted, while the temporal distribution of the latter is only of secondary importance. It should be taken into account, however, that the data network may thus be loaded even more heavily in a burstlike manner.

In the case of a primary rate access, e.g. for a private branch exchange, the data channel, which is then a D64 channel, may also carry two or more data calls originating from two or more D16 channels simultaneously. In this case, too, it is appropriate and possible to add the capacity of unused B channels to this D channel. Then, however, the total available capacity will, in principle, be distributed to the individual data calls in the same manner as the capacity of the D channel, whose capacity is not increased.

Since the onward routing of the data calls in the network is different than that on the subscriber line, the two subscriber lines of two parties engaged in a data call need not be of the same design. It is quite possible to carry such a call at one end in an expanded D channel in accordance with the invention and at the other end in a B channel. Then, however, the capacity at the other end cannot be made available, even if it is currently not needed.

Figure 4:
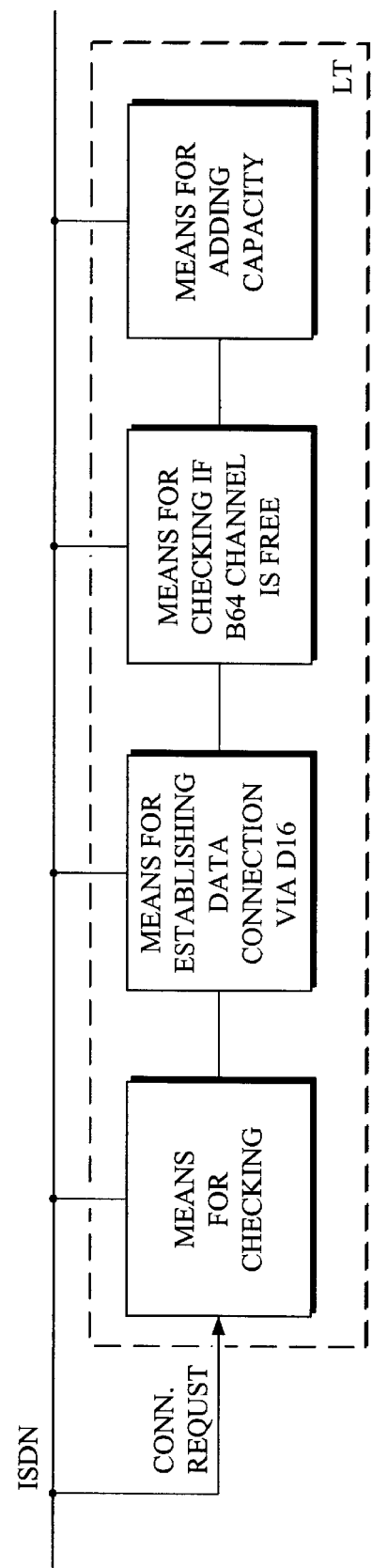
FIG. 4 shows a block diagram of an LT, according to the invention.
Figure 5:
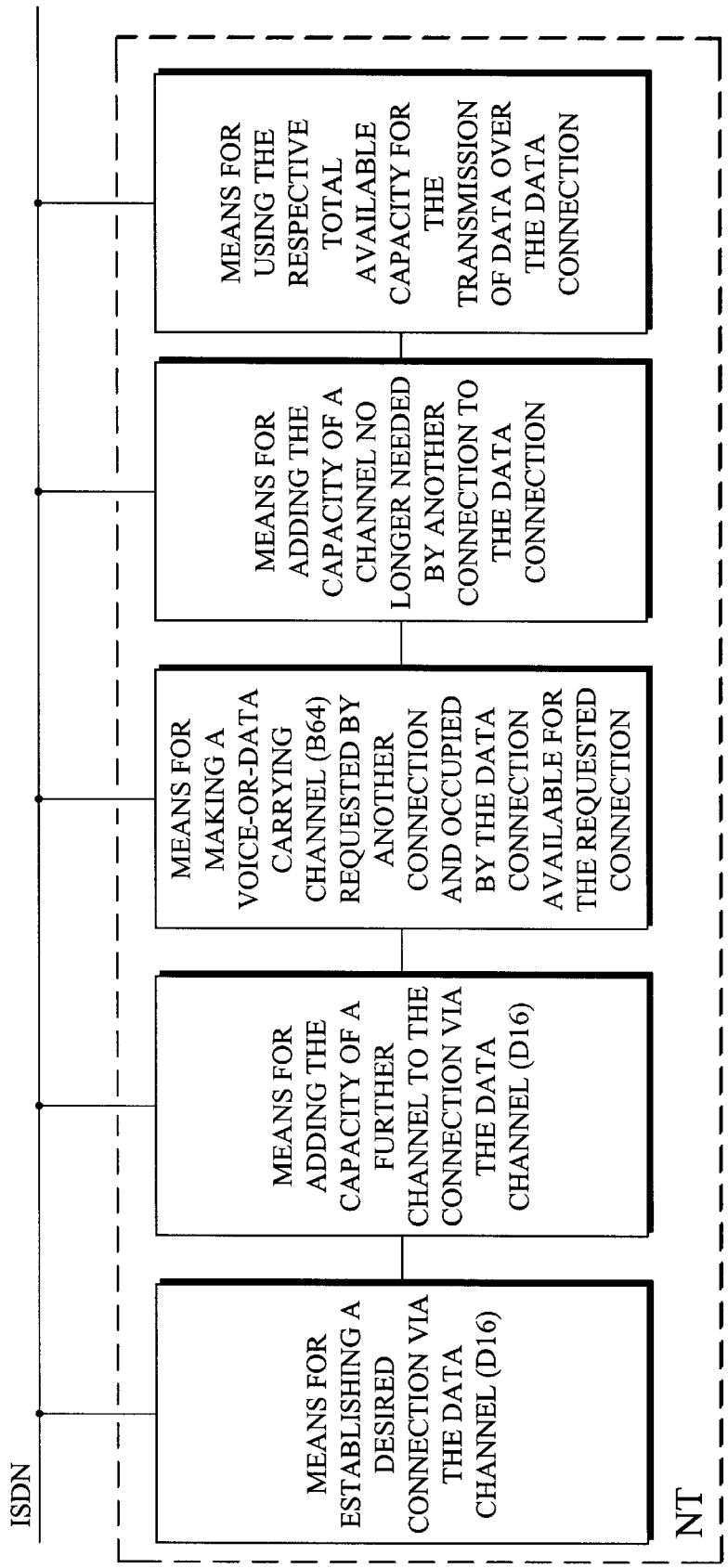
FIG. 5 shows a block diagram of an NT, according to the invention.

From the description of the method, the means for carrying out the method follow automatically for those skilled in the art as shown in FIG. 4 for an LT and FIG. 5 for an NT. By contrast, the distribution to the exchange and the line termination on the one hand and to the data terminal and the network termination on the other hand is, from a technical point of view, arbitrary.

what is claimed is:

1. A method of transmitting data on an ISDN subscriber line having a data channel (D16) and two or more voice- or data-carrying channels (B64), using the data channel, characterized in that on receipt of each connection request, a check is made to determine whether the desired connection can be or is to be established as a data connection, that said connection is established using part of the capacity of the data channel (D16), that a further check is made to determine whether a voice- or data-carrying channel (B64) is still free, that the capacity of said channel is added to the capacity used by said connection using part of the data channel (D16), that provision is made for continuously monitoring whether a voice- or data-carrying channel (B64) occupied by the data connection is requested for another connection or whether such a channel hitherto needed for another connection is no longer needed therefor, that a voice- or data-carrying channel (B64) requested by another connection and occupied by the data connection is made available for the requested connection, that the capacity of a channel no longer needed by another connection is added to the capacity previously used by the data connection, and that for the transmission of data over the data connection, the respective total available capacity is used.

2. A line termination (LT) for an exchange, comprising devices for terminating at least one ISDN subscriber line having a data channel (D16) and two or more voice- or data-carrying channels (B64), characterized in that the line termination further comprises means for checking upon receipt of each connection request whether the desired connection can be or is to be established as a data connection, for establishing said connection using part of the capacity of the data channel (D16), for checking whether a voice- or data-carrying channel (B64) is still free, for adding the capacity of said channel to the capacity used by the connection via the data channel (D16), for continuously monitoring whether a voice- or data-carrying channel (B64) occupied by the data connection is requested for another connection or whether such a channel hitherto needed for another connection is no longer needed, for making a voice- or data-carrying channel (B64) requested by another connection and occupied by the data connection available for the requested connection, for adding the capacity of a channel no longer needed by another connection to the capacity previously used by the data connection, and for using the respective total available capacity for the transmission of data over the data connection.

3. An exchange with a line termination (LT) comprising devices for terminating at least one ISDN subscriber line having a data channel (D16) and two or more voice- or data-carrying channels (B64), characterized in that the line termination further comprises means for checking upon receipt of each connection request whether the desired connection can be or is to be established as a data connection, for establishing said connection using part of the capacity of the data channel (D16), for checking whether a voice- or data-carrying channel (B64) is still free, for adding the capacity of said channel to the capacity used by the connection via the data channel (D16), for continuously monitoring whether a voice- or data-carrying channel (B64) occupied by the data connection is requested for another connection or whether such a channel hitherto needed for another connection is no longer needed, for making a voice- or data-carrying channel (B64) requested by another connection and occupied by the data connection available for the requested connection, for adding the capacity of a channel no longer needed by another connection to the capacity previously used by the data connection, and for using the respective total available capacity for the transmission of data over the data connection.

4. A network termination (NT) for a data terminal, for connection to an ISDN subscriber line having a data channel (D16) and two or more voice- or data-carrying channels (B64), characterized in that the network termination comprises means for establishing a desired connection via the data channel (D16), for adding the capacity of a further channel to the capacity used by the connection via the data channel (D16), for making a voice- or data-carrying channel (B64) requested by another connection and occupied by the data connection available for the requested connection, for adding the capacity of a channel no longer needed by another connection to the capacity previously used by the data connection, and for using the respective total available capacity for the transmission of data over the data connection.

5. A data terminal with a network termination (NT), for connection to an ISDN subscriber line having a data channel (D16) and two or more voice- or data-carrying channels (B64), characterized in that the network termination comprises means for establishing a desired connection using part of the capacity of the data channel (D16), for adding the capacity of a further channel to the capacity used by the connection via the data channel (D16), for making a voice- or data-carrying channel (B64) requested by another connection and occupied by the data connection available for the requested connection, for adding the capacity of a channel no longer needed by another connection to the capacity previously used by the data connection, and for using the respective total available capacity for the transmission of data over the data connection.

\* \* \* \* \*